(12) United States Patent
Yamauchi et al.

(10) Patent No.: US 9,442,408 B2
(45) Date of Patent: Sep. 13, 2016

(54) MEMBER FOR ELECTROPHOTOGRAPHY, METHOD FOR PRODUCING THE SAME, AND IMAGE FORMING APPARATUS

(71) Applicant: CANON KABUSHIKI KAISHA, Tokyo (JP)

(72) Inventors: Kazuhiro Yamauchi, Suntou-gun (JP); Kenichi Yamauchi, Mishima (JP); Satoru Nishioka, Suntou-gun (JP); Hiroki Masu, Tokyo (JP); Noriko Suzumura, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/945,314

(22) Filed: Nov. 18, 2015

(65) Prior Publication Data

US 2016/0154335 A1  Jun. 2, 2016

(30) Foreign Application Priority Data

Nov. 28, 2014 (JP) .................................. 2014-241941

(51) Int. Cl.
*G03G 15/02* (2006.01)
*B32B 1/08* (2006.01)

(52) U.S. Cl.
CPC ............. *G03G 15/0233* (2013.01); *B32B 1/08* (2013.01)

(58) Field of Classification Search
CPC .................................................. G03G 15/0233
See application file for complete search history.

(56) References Cited

U.S. PATENT DOCUMENTS

| | | | |
|---|---|---|---|
| 6,558,781 B1 | 5/2003 | Fuei et al. | |
| 8,503,911 B2 | 8/2013 | Suzumura et al. | |
| 8,526,857 B2 | 9/2013 | Tomomizu et al. | |
| 9,086,643 B2 | 7/2015 | Kikuchi et al. | |
| 9,360,789 B1* | 6/2016 | Masu ................. | G03G 15/0233 |
| 2013/0004206 A1 | 1/2013 | Kuroda et al. | |
| 2013/0034369 A1 | 2/2013 | Masu et al. | |
| 2013/0064571 A1 | 3/2013 | Kodama et al. | |
| 2014/0004258 A1 | 1/2014 | Suzumura et al. | |
| 2014/0072343 A1 | 3/2014 | Masu et al. | |
| 2014/0080691 A1 | 3/2014 | Kurachi et al. | |
| 2015/0331342 A1* | 11/2015 | Yamaguchi ............ | G03G 5/043 |
| | | | 492/18 |
| 2015/0331343 A1* | 11/2015 | Yamada ................. | G03G 5/071 |
| | | | 492/18 |

(Continued)

FOREIGN PATENT DOCUMENTS

JP  4365996 B2  11/2009
JP  6106009 B2  12/2012

OTHER PUBLICATIONS

Masu, et al., U.S. Appl. No. 14/956,862, filed Dec. 2, 2015.
Yamauchi et al., U.S. Appl. No. 14/945,297, filed Nov. 18, 2015.

(Continued)

*Primary Examiner* — Joshua D Zimmerman
(74) *Attorney, Agent, or Firm* — Fitzpatrick, Cella, Harper & Scinto

(57) ABSTRACT

A member for electrophotography for use in forming a high quality electrophotographic image for a long period is provided. The member for electrophotography includes a support, an elastic layer on the support, and a surface layer on the elastic layer. The elastic layer includes a quaternary ammonium salt and an epichlorohydrin rubber. The surface layer includes a material having a specific structure. A universal hardness a surface of the surface layer is 1.0 $N/mm^2$ or more and 5.0 $N/mm^2$ or less.

8 Claims, 2 Drawing Sheets

(56) References Cited

U.S. PATENT DOCUMENTS

2015/0331348 A1 11/2015 Doi et al.
2016/0154366 A1* 6/2016 Yamauchi .......... G03G 15/0233
                                                                399/176

OTHER PUBLICATIONS

Nishioka, et al. U.S. Appl. No. 14/943,774, filed Nov. 17, 2015.
Masu, et al., U.S. Appl. No. 14/946,768, filed Nov. 19, 2015.

* cited by examiner

MEMBER FOR ELECTROPHOTOGRAPHY, METHOD FOR PRODUCING THE SAME, AND IMAGE FORMING APPARATUS

BACKGROUND OF THE INVENTION

1. Field of the Invention

The present invention relates to a member for electrophotography, a method for producing the same, and an image forming apparatus.

2. Description of the Related Art

In an electrophotographic image forming apparatus, members for electrophotography such as a charging member, a development member and a transfer member are used. As the member for electrophotography, a member for electrophotography having a support and an electro-conductive elastic layer which contains a polymer such as rubber on the support is used in some cases. In order to impart a prescribed electro-conductivity, for example, an electrical resistivity of $1 \times 10^3$ to $1 \times 10^{10}$ $\Omega \cdot$cm, an ionic conductive material such as a quaternary ammonium salt may be contained in the elastic layer in some cases.

When a member for electrophotography having an elastic layer with electrical conductivity introduced with addition of an ionic conductive material is used for a long term, the ionic conductive material and low-molecular weight components of a polymer in the elastic layer bleed out on the surface of the member for electrophotography in some cases.

For example, when a member for electrophotography having an elastic layer including an ionic conductive material is used as charging member in contact with an object to be charged such as an electrophotographic photosensitive member for contact-charging, the ionic conductive material and low-molecular weight components of a polymer bleeding out from the elastic layer of the member for electrophotography adhere to the region of the object to be charged in contact with the member for electrophotography for a long period in some cases. The bleeding substances from the elastic layer adhere to the surface of the photosensitive member can be one cause of image defects such as white voids (blank spots) and density irregularities in an electrophotographic image.

In Japanese Patent No. 4365996, an electro-conductive roller is disclosed, having an electro-conductive support, an electro-conductive elastic layer including a quaternary ammonium salt compound of perchloric acid and a specific rubber, and a resistive layer. According to the description in the paragraph [0046] of Japanese Patent No. 4365996, the resistive layer is formed to prevent the adhesion to the electrophotographic photosensitive member and the pollution of the electrophotographic photosensitive member, and with use of a binder resin of synthetic resin such as a urethane resin from the viewpoints of flexibility and abrasion resistance, dispersed electro-conductive inorganic particles can be used to control the resistance. Further, according to the description in the same paragraph, the resistive layer can be mainly formed of urethane resin, in particular.

The present invention is directed to providing a member for electrophotography which can prevent the components in an elastic layer from moving to the surface, even when used for a long term, and a method for producing the same.

The present invention is also directed to providing an image forming apparatus capable of stably forming a high-quality electrophotographic image for a long period.

SUMMARY OF THE INVENTION

According to an embodiment of the present invention, there is provided a member for electrophotography, including a support, an elastic layer on the support, and a surface layer on the elastic layer; in which the elastic layer includes a quaternary ammonium salt and an epichlorohydrin rubber; the surface layer includes a polymer having any one or both of the structures represented by the following formulae (1) and (2), any one or both of the structures represented by the following formulae (3) and (4), and a structure represented by the following formula (5); and, a universal hardness of a surface of the surface layer is 1.0 N/mm² or more and 5.0 N/mm² or less.

Formula (1)

Formula (2)

Formula (3)

Formula (4)

Formula (5)

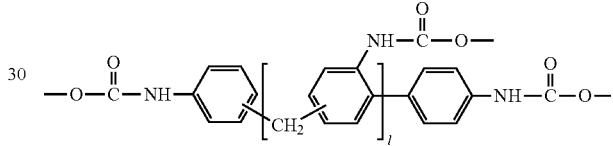

In Formula (5), 1 represents an integer of 1 or more.

According to another embodiment of the present invention, there is provided an image forming apparatus, including an electrophotographic photosensitive member, a charging apparatus for charging the electrophotographic photosensitive member, a developing apparatus for developing an electrostatic latent image formed on the electrophotographic photosensitive member with a developer, and a transfer member for transferring the developer supported on the electrophotographic photosensitive member on a transfer medium; the charging apparatus having a charging member as the member for electrophotography.

According to further embodiment of the present invention, there is provided a method for producing a member for electrophotography comprising a support, an elastic layer on the support, and a surface layer on the elastic layer, a surface of the surface layer having a universal hardness of 1.0 N/mm² or more and 5.0 N/mm² or less, the method comprising the steps of:

forming the elastic layer comprising a quaternary ammonium salt and an epichlorohydrin rubber on a support;

forming a coat of a coating liquid on the elastic layer, the coating liquid comprising a polyol and an polyisocyanate; and reacting the polyol and the polyisocyanate in the coat to form the surface layer, wherein the polyol contains:
any one or both of the following a) and b);
any one or both of the following c) and d); and
the polyisocyanate contains the following e):

a): any one or both of a compound having a structure represented by Formula (6) and a prepolymer derived from the compound having a structure represented by Formula (6);

b): any one or both of a compound having a structure represented by Formula (7) and a prepolymer derived from the compound having a structure represented by Formula (7);

c): any one or both of a compound represented by Formula (8) and a prepolymer derived from the compound represented by Formula (8);

d): any one or both of a compound represented by Formula (9) and a prepolymer derived from the compound represented by Formula (9); and e): any one or both of a compound represented by Formula (10) and a prepolymer derived from the compound represented by Formula (10):

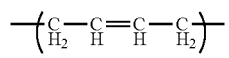

Formula (6)

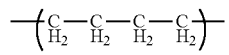

Formula (7)

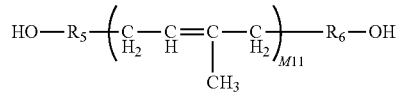

Formula (8)

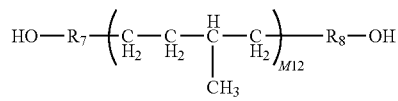

Formula (9)

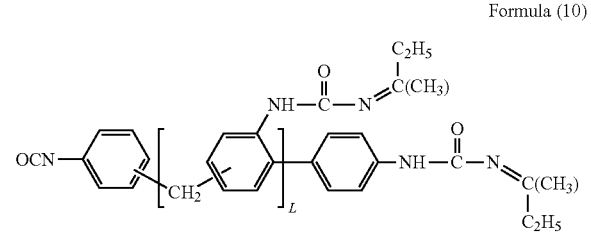

Formula (10)

in the Formulae (8) to (9), $R_5$ to $R_8$ each independently represent a divalent organic group; and M11 and M12 each independently represent an integer of 1 or more; and in the Formulae (10), L represents an integer of 1 or more.

Further features of the present invention will become apparent from the following description of exemplary embodiments with reference to the attached drawings.

DESCRIPTION OF THE EMBODIMENTS

Figure 1:
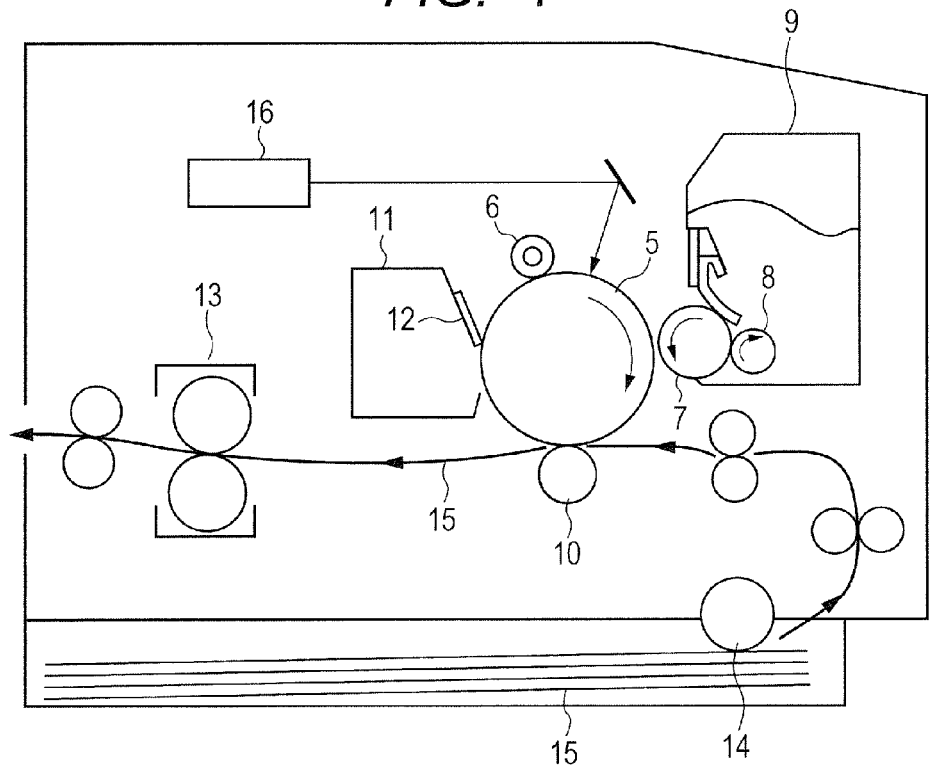
FIG. 1 is a cross-sectional view of an image forming apparatus in an embodiment of the present invention.

Preferred embodiments of the present invention will now be described in detail in accordance with the accompanying drawings.

Recently, an electrophotographic image forming apparatus has been required to have further improved durability, so that a member for electrophotography needs to prevent a bleeding substance from bleeding to the surface from an elastic layer when used for a long term.

According to the investigation by the present inventors, a surface layer mainly composed of a urethane resin is excellent in followability to the deformation of an elastic layer. The present inventors, however, found that the capability of a member for electrophotography to prevent a bleeding substance from reaching the surface of the member for electrophotography from the elastic layer for a long period is still required to be improved.

Recently, from the viewpoints of simplifying an image forming apparatus and eliminating wastes, in particular, an adoption of a cleaner-less system (toner recycling system) in an electrophotographic image forming apparatus has been proposed.

The system eliminates the use of a cleaner as cleaning unit for an electrophotographic photosensitive member after a transfer step, and the transfer residual toner on the electrophotographic photosensitive member after transfer is removed by cleaning the transfer residual toner on the electrophotographic photosensitive member by the developing apparatus in parallel with development, and collected in the developing apparatus.

In the method for cleaning the transfer residual toner on the electrophotographic photosensitive member in parallel with development, the transfer residual toner on the electrophotographic photosensitive member is collected by a fog removing bias, i.e. a potential difference Vback for fog removing between the DC voltage to be applied to a developing apparatus and the surface potential of the electrophotographic photosensitive member in development of the electrostatic latent image on the electrophotographic photosensitive member in the step of forming a next electrophotographic image.

In the case of using a contact-charging type charging member in a cleaner-less system, it has been proposed to make the difference in circumferential speed between the electrophotographic photosensitive member and the charging member disposed in contact with the electrophotographic photosensitive member, in order to prevent the transfer residual toner from adhering to the charging member. In this case, it is conceivable that the presence of a bleeding substance on the surface of the charging member from the elastic layer allows the bleeding substance to more easily adhere to the surface of the electrophotographic photosensitive member.

Regarding an electro-conductive roller described in Japanese Patent No. 4365996, having an elastic layer including a quaternary ammonium salt and an epichlorohydrin rubber, and a resistive layer (surface layer) mainly composed of urethane resin on the elastic layer, the present inventors analyzed the substances derived from the elastic layer, present on the surface of the surface layer. As a result, the substances were identified to be hydrophilic materials such as low-molecular weight epichlorohydrin rubber and a quaternary ammonium salt.

The present inventors presumed that for the surface layer including a urethane resin as a binder resin, the pathway through which the bleeding substance from an elastic layer reaches the surface of the member for electrophotography through the surface layer is a soft segment part of the urethane resin.

The present inventors therefore examined whether the soft segment of the urethane resin to be contained in the surface layer having any one or both of the structures represented by the following formulae (1) and (2) and any one or both of the structures represented by the following formulae (3) and (4) can have reduced compatibility with the bleeding substances mainly composed of hydrophilic materials.

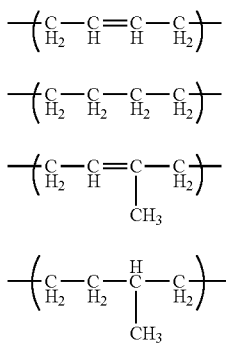

Formula (1)
Formula (2)
Formula (3)
Formula (4)

As a result, it was found that the member for electrophotography including the urethane resin described above as a binder resin of the surface layer can prevent the bleeding substances from bleeding to the surface from the elastic layer for a long period. It is conceivable that, since the soft segment part of the urethane resin, which is presumed to be the passage for the bleeding substances in the surface layer, has low compatibility with bleeding substances, the bleeding substances hardly invade the surface layer, or even when the bleeding substances invade the surface layer, the bleeding substances hardly migrate in the surface layer.

The urethane resin of the present invention further has a structure represented by the following Formula (5). In Formula (5), l represents an integer of 1 or more.

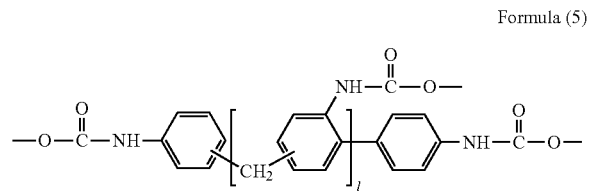

Formula (5)

The structure represented by Formula (5) constitutes the hard segment of the urethane resin of the present invention. The urethane resin of the present invention thereby has a three-dimensional cross-linking structure, so that a surface layer excellent in durability can be obtained.

Further, the surface layer of the present invention has a universal hardness of 1.0 N/mm$^2$ or more and 5.0 N/mm$^2$ or less measured at the surface on the opposite side of the surface opposed to the support. Due to such flexibility of the surface layer, the member for electrophotography of the present invention can be suitably used as a charging member, a development member or a transfer member. More specifically, when used as the charging member for contact charging, a stable nip can be formed with an electrophotographic photosensitive member. When used as a development member, no excessive stress is imparted to the toner, so that deformation of the toner can be effectively prevented. The specific method for imparting the universal hardness in the numerical range in the surface layer is described later.

<Structure of Member for Electrophotography>

Figure 2:
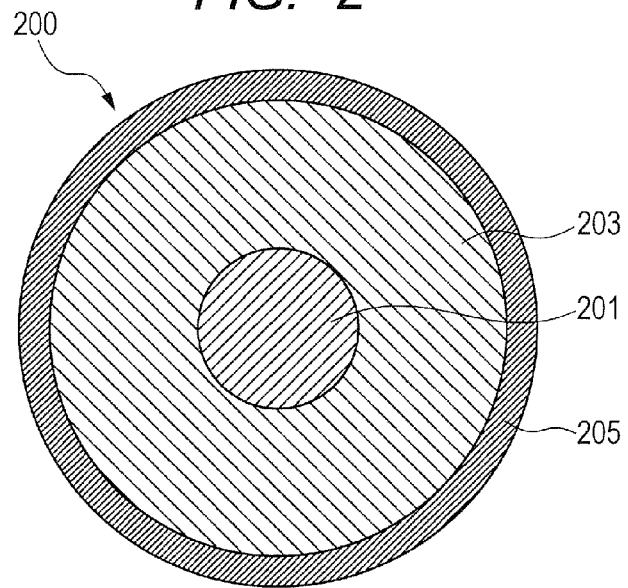
FIG. 2 is a schematic cross-sectional view of a member for electrophotography in an embodiment of the present invention.

FIG. 2 is a cross-sectional view of a member for electrophotography 200 in a roller shape (hereinafter also referred to as "roller for electrophotography") of the present invention, in the direction orthogonal to the circumferential direction. The roller for electrophotography 200 illustrated in FIG. 2 includes a support 201, an elastic layer 203 on the circumferential surface of the support, and a surface layer 205 on the circumferential surface of the elastic layer.

<Support>

As the support, an electro-conductive support may be used, and may be appropriately selected from known ones in the field of members for electrophotography. Examples of the support include a cylinder of carbon steel alloy of which the surface is coated with nickel plating having a thickness of about 5 μm.

<Elastic Layer>

The elastic layer includes a quaternary ammonium salt and an epichlorohydrin rubber. Examples of the epichlorohydrin rubber include the following: an epichlorohydrin homopolymer, an epichlorohydrin-ethylene oxide copolymer, an epichlorohydrin-allyl glycidyl ether copolymer, and an epichlorohydrin-ethylene oxide-allyl glycidyl ether ternary copolymer.

Any one of the epichlorohydrin rubbers may be used alone, or two or more thereof may be used in combination. Among these, in particular, an epichlorohydrin-ethylene oxide-allyl glycidyl ether ternary copolymer can be used, due to having stable electro-conductivity in the medium resistance range.

The degree of polymerization and the composition ratio of an epichlorohydrin-ethylene oxide-allyl glycidyl ether ternary copolymer are optionally adjusted to control the electro-conductivity and the workability.

When a low-molecular weight epichlorohydrin, in particular, an ethylene oxide component, adheres to the surface of an electrophotographic photosensitive member, defects in an electrophotographic image can be caused.

Accordingly, in the case of using the ternary copolymer, the component proportion (monomer proportion) of ethylene oxide in the ternary copolymer is preferably 50 mol % or more and 70 mol % or less, more preferably 50 mol % or more and 60 mol % or less. With a component proportion of 50 mol % or more, sufficient electro-conductivity can be secured. With a component proportion of 70 mol % or less, in particular, 60 mol % or less, the occurrence of bleeding substance itself derived from an elastic layer can be effectively inhibited. The content of epichlorohydrin rubber can be 30 to 90 parts by mass based on 100 parts by mass of an elastic layer.

The elastic layer may include an epichlorohydrin rubber alone as rubber component, or may include an epichlorohydrin rubber as main component and other rubbers on an as-needed basis. Examples of the other rubber include the following: EPM (ethylene-propylene rubber), EPDM (ethylene-propylene-diene rubber), NBR (nitrile rubber), chloroprene rubber, natural rubber, isoprene rubber, butadiene rubber, styrene-butadiene rubber, urethane rubber, and silicone rubber.

The elastic layer may include a thermoplastic elastomer such as SBS (styrene-butadiene-styrene block copolymer) and SEBS (styrene-ethylenebutylene-styrene block copolymer). One of them may be used alone, or two or more may be used in combination. When the other rubbers are contained, the content of the other rubbers can be 1 to 50 parts by mass based on 100 parts by mass of the elastic layer.

A quaternary ammonium salt functions as an ionic conductive material.

Cationic ion conductive materials such as a sulfonate and a phosphonate exhibit ultra-strong acidity with generation of sulfonic acid, phosphonic acid or the like when a salt exchange reaction proceeds.

In the case of using a cationic ion conductive material in an epichlorohydrin rubber, the oxidative decomposition of the epichlorohydrin rubber is therefore accelerated in some cases. In the present invention, a quaternary ammonium salt as an anionic ion conductive material having high ionic conductivity can be therefore used. Examples of the anionic component of a pair with the quaternary ammonium ion include a halogen ion such as a fluorine ion, a chlorine ion, a bromine ion and an iodine ion, a perchlorate ion, a sulfonate ion, a phosphate ion, a borate ion, and a sulfonylimide ion. Among these, in particular, a perchlorate ion can be used, with more reduction in the degree of contamination of an electrophotographic photosensitive member even when bleeded components adhere to the electrophotographic photosensitive member. In other words, the quaternary ammonium salt can include a perchlorate ion and a quaternary ammonium ion.

The content of quaternary ammonium salt can be in the range allowing the volume resistivity of an elastic layer to be $1 \times 10^3$ to $1 \times 10^9$ Ω·cm in a low temperature and low humidity environment (temperature: 15° C., relative humidity: 10%), in a normal temperature and normal humidity environment (temperature: 23° C., relative humidity: 50%), and in a high temperature and high humidity environment (temperature: 30° C., relative humidity: 80%). A member for electrophotography having excellent electrical properties can be thereby obtained.

On an as-needed basis, the elastic layer may further include compounding agents such as a plasticizer, a filler, a vulcanizing agent, a vulcanization accelerator, an anti-aging agent, an anti-scorching agent, a dispersant, and a releasing agent.

The volume resistivity of an elastic layer is measured by the following method.

First, a sheet having a length of 75 mm, a width of 75 mm, and a thickness of 1 mm was formed from a mixture of materials for forming an elastic layer by molding. Subsequently, platinum was vapor-deposited on the front and rear surfaces of the sheet in a thickness of 80 nm. A volume resistivity of the prepared specimen for the measurement of volume resistivity was measured using a sheet resistance measuring instrument (trade name: Hiresta MCP-HT450, manufactured by Mitsubishi Chemical Analytech, Co., Ltd.). An inner diameter of a main electrode of the measuring instrument is 50 mm. An inner diameter of a guard ring electrode of the measuring instrument is 53.2 mm. An outer diameter of a probe (trade name: UR-100, manufactured by Mitsubishi Chemical Analytech, Co., Ltd.) is 57.2 mm. A voltage of 200V was applied to the specimen for the measurement, and a current value after two seconds was measured. The volume resistivity of the specimen was calculated from an average value of a total of 3 points.

The elastic layer has a micro hardness (MD-1 type) of preferably 50° or more and 70° or less, more preferably 50° or more and 60° or less. When the elastic layer with a micro hardness (MD-1 type) in the numerical range is contacted with another member, a sufficient nip can be formed without excessive deformation of the elastic layer.

The "micro hardness (MD-1 type)" is a hardness measured by using a micro rubber hardness tester (trade name: MD-1 capa Type C, manufactured by Kobunshi Keiki Co., Ltd.).

The indenter point for use has a hemispherical shape with a height of 0.50 mm and a diameter of 1.00 mm.

Specifically, the surface layer of a member for electrophotography is peeled off or cut off for removal to expose the surface of an elastic layer, and the member for electrophotography is then left standing in a normal temperature and normal humidity environment (temperature: 23° C., relative humidity: 55%) for 12 hours, to make a specimen for the measurement. Subsequently, the indenter point is pressed against the surface of the specimen for the measurement with a force of 10 N. The measurement value is read after 30 seconds of contact through the use of the hardness tester. The measurement mode is set to the peak-hold mode.

The elastic layer can be made by mixing the raw materials of the elastic layer in a closed mixer and then forming by, for example, extrusion molding, injection molding and press molding. The elastic layer may be formed directly on a support, or the elastic layer may be formed into a tubular form in advance so as to cover on a support. After making of an elastic layer, the surface may be polished to adjust the shape.

<Surface Layer>

The surface of a surface layer on the opposite side of the surface opposed to the elastic layer is the surface to compose the outer surface of a member for electrophotography. The "surface" of the surface layer in the present invention means the surface to compose the outer surface of a member for electrophotography.

The surface layer includes a polymer having any one or both of the structures represented by Formulae (1) and (2), any one or both of the structures represented by Formulae (3) and (4), and the structure represented by Formula (5), as a binder resin.

The surface layer may further include a roughness-providing particle, an electro-conductive particle, a silicone additive and other additives.

<Binder Resin>

The surface layer includes a urethane resin as a binder resin. The urethane resin is a polymer having any one or both of the structures represented by Formulae (1) and (2), any one or both of the structures represented by Formulae (3) and (4), and the structure represented by Formula (5).

The member for electrophotography with a surface layer including a polymer having the structures as a binder resin has a distinctly reduced amount of bleeding substances observed on the surface after a long term use.

Although the reason that the member for electrophotography of the present invention exhibits the effect is still under investigation, the present inventors presume the reason as follows.

The polymer of the present invention, i.e. the urethane resin, has a soft segment part which is more hydrophobized in comparison with a urethane resin obtained from ether-based materials.

Consequently, it is conceivable that the bleeding substances from the elastic layer of a member for electrophotography is prevented from invading the surface layer. It is also conceivable that even when the bleeding substances invade the surface layer from the elastic layer, the bleeding substances in the surface layer hardly approach the soft segment of the urethane resin, so that the bleeding substances hardly reach the surface-side from the elastic layer-side in the surface layer.

In Formula (5), l represents an integer of 1 or more, and can be an integer of 10 or more. The upper limit of l is not particularly limited, and can be, for example, an integer of 100 or less.

In the urethane resin of the present invention, the ratio of the total of the number of moles of the structural part represented by the Formula (1) and the number of moles of the structural part represented by the Formula (2) (hereinafter referred to as the number of moles "A") to the total of the number of moles of the structural part represented by the Formula (3) and the number of moles of the structural part represented by the Formula (4) (hereinafter referred to as the number of moles "B"), i.e. (A/B), can be 10 or more and 90 or less. With a ratio in the numerical range, the effect of the surface layer for inhibiting the bleeding of bleeding substances from the elastic layer to the surface of a member for electrophotography can be further improved.

In order to introduce the structure represented by the Formula (1) in a urethane resin, a polybutadiene polyol having the structure represented by the following Formula (6) in a molecule may be used as the raw material of the urethane resin.

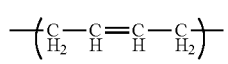

Formula (6)

The polybutadiene polyol can have a weight average molecular weight of 500 or more and 5,000 or less. Examples of commercial products include "G-1000", "G-2000" and "G-3000" (trade name in any case, manufactured by Nippon Soda Co., Ltd.), "Poly ip" (trade name, manufactured by Idemitsu Kosan Co., Ltd.), and "KRASOL LBH-2000" and "KRASOL LBH-P-3000" (trade name in any case, manufactured by Cray Valley Ltd.). One of the products may be used alone, or two or more thereof may be used in combination.

In order to introduce the structure represented by the Formula (2) in a urethane resin, a hydrogenated polybutadiene polyol having the structure represented by the following Formula (7) in a molecule may be used as the raw material of the urethane resin.

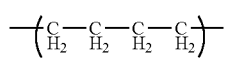

Formula (7)

The hydrogenated polybutadiene polyol having a structure represented by the formula (7) can have a weight average molecular weight of 500 or more and 5,000 or less. Examples of the commercial product include "GI-1000", "GI-2000" and "GI-3000" (trade name in any case, manufactured by Nippon Soda Co., Ltd.), and "KRASOL HLBH-P 2000" and "KRASOL HLBH-P 3000 (trade name in any case, manufactured by Cray Valley Ltd.). One of the products may be used alone, or two or more thereof may be used in combination.

In order to introduce the structure represented by the Formula (3) in a urethane resin, a polyisoprene polyol represented by the following Formula (8) may be used as the raw material of the urethane resin.

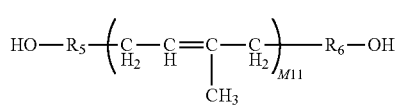

Formula (8)

In the Formula (8), $R_5$ and $R_6$ each independently represent a divalent organic group. Examples of the divalent organic group include a divalent hydrocarbon group. More specifically, a straight chain or branched chain divalent hydrocarbon group having 1 or more and 10 or less carbon atoms. M11 represents an integer of 1 or more, and can be an integer of 10 or more. The upper limit of M11 is not particularly limited, and can be, for example, an integer of 100 or less. The polyisoprene polyol can have a weight average molecular weight of 500 or more and 5,000 or less. Examples of the commercial product include "Poly ip" (trade name, manufactured by Idemitsu Kosan Co., Ltd.). One of the products may be used alone, or two or more thereof may be used in combination.

In order to introduce the structure represented by the Formula (4) in a urethane resin, a hydrogenated polyisoprene polyol represented by the following Formula (9) may be used as the raw material of the urethane resin.

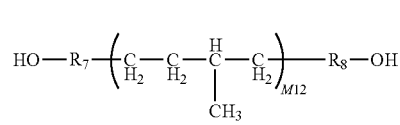

Formula (9)

In the Formula (9), $R_7$ and $R_8$ each independently represent a divalent organic group. Examples of the divalent organic group include a divalent hydrocarbon group. More specifically, a straight chain or branched chain divalent hydrocarbon group having 1 or more and 10 or less carbon atoms. M12 represents an integer of 1 or more, and can be an integer of 10 or more. The upper limit of M12 is not particularly limited, and can be, for example, an integer of 100 or less. The hydrogenated polyisoprene polyol can have a weight average molecular weight of 500 or more and 5,000 or less. Examples of the commercial product include "EPOL" (trade name, manufactured by Idemitsu Kosan Co., Ltd.). One of the products may be used alone, or two or more thereof may be used in combination.

In order to introduce the structure represented by the Formula (5) in a urethane resin, a polymeric MDI blocked with MEK oxime represented by the following Formula (10) may be used as the raw material of the urethane resin.

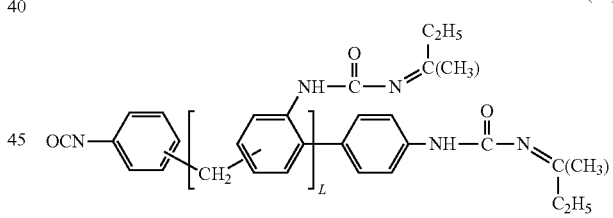

Formula (10)

In the Formula (10), L represents an integer of 1 or more. The upper limit of L is not particularly limited, and can be, for example, an integer of 50 or less. Use of the polymeric MDI improves the stability of a coating liquid, with the overreaction of isocyanate groups being inhibited. Alternatively, a prepolymer of which the chain is extended with a polyol in advance may be used.

For example, the urethane resin of the present invention may be obtained by reacting the mixture of:
a polyol with polyol components including
any one or both of the following a) and b), and
any one or both of the following c) and d), and
a polyisocyanate with an isocyanate component including the following e).
a): any one or both of a compound having a structure represented by Formula (6) and a prepolymer derived from the compound having a structure represented by Formula (6);

b): any one or both of a compound having a structure represented by Formula (7) and a prepolymer derived from the compound having a structure represented by Formula (7);

c): any one or both of a compound represented by Formula (8) and a prepolymer derived from the compound represented by Formula (8);

d): any one or both of a compound represented by Formula (9) and a prepolymer derived from the compound represented by Formula (9); and e): any one or both of a compound represented by Formula (10) and a prepolymer derived from the compound represented by Formula (10).

The ratio of the number of moles of isocyanate to the number of moles of hydroxyl group in the mixture, i.e. the isocyanate index (NCO/OH), can be 1.1 or more and 2.0 or less.

With an isocyanate index in the numerical range, the presence of residual unreacted components in the urethane resin can be inhibited. With an isocyanate index in the range of 2.0 or less, the hardness of the elastic layer can be reduced.

<Roughness-Providing Particle>

The surface layer can include a roughness-providing particle such that the surface has a convex derived from the roughness-providing particle. The surface layer having a convex derived from the roughness-providing particle on the surface can inhibit the adhesion of external additives and toner to the surface of a member for electrophotography.

Specific examples of the roughness-providing particle include a resin particle formed of, for example, an acrylic resin, a polycarbonate resin, a styrene resin, a urethane resin, a fluorine resin and a silicone resin, and an inorganic particle formed of, for example, titanium oxide, silica, alumina, magnesium oxide, strontium titanate, barium titanate, barium sulfate, calcium carbonate, mica, zeolite and bentonite.

Since it is desired that the surface layer is deformed to increase the opportunity to contact with contamination materials such as external additives and toner, a resin particle having flexibility can be used as the roughness-providing particle. One of the roughness-providing particles may be used alone, or two or more thereof may be used in combination.

The roughness-providing particle has an average particle diameter of, preferably 3 µm or more and 30 µm or less, particularly preferably 5 µm or more and 15 µm or less. The average particle diameter of the roughness-providing particle is calculated through observation of the section of the surface layer cut in the direction orthogonal to the longitudinal direction of a member for electrophotography with a scanning electron microscope (SEM). The detailed method is described in Examples.

The content of the roughness-providing particle in a surface layer can be 10 parts by mass or more and 50 parts by mass or less based on 100 parts by mass of the surface layer.

<Electro-Conductive Particle>

Examples of the electro-conductive particle include carbon black, a metal oxide based electro-conductive particle such as titanium oxide, tin oxide and zinc oxide, and a metal based electro-conductive particle such as aluminum, iron, copper and silver. One of the electro-conductive particles can be used alone, or two or more thereof may be used in combination. Alternatively, a composite particle including a silica particle coated with an electro-conductive particle can be used as the electro-electro-conductive particle. Carbon black can be used as an electro-conductive particle. Since carbon black has a small specific gravity and a high electro-conductivity, a small amount of carbon black added to a binder resin allows sufficient electro-conductivity to be secured. Furthermore, the hardness of a surface layer can be maintained at a low level. An electro-conductive particle may also function as the roughness-providing particle.

<Silicone Additive>

A silicone additive can be added to a coating material for forming a surface layer, so as to improve the slippage of the surface of the surface layer. The improvement in the slippage of the surface of the surface layer can suppress the abrasion of the surface layer for a long term use of the member for electrophotography.

In particular, when a silicone oil having a reactive functional group reactive with the binder resin is used, the silicone oil and the binder resin are connected to each other through chemical bonds in a process for forming the surface layer. As a result, the occurrence of bleeding can be substantially inhibited. The raw material of the surface layer can therefore include a reactive silicone oil. For example, when a coating liquid as raw material of the surface layer is applied to the surface of an elastic layer so as to form the surface layer, the coating liquid can include a reactive silicone oil. Examples of the reactive silicone oil include a silanol-modified silicone oil, a carbinol-modified silicone oil, an amino-modified silicone oil, a polyether-modified silicone oil, a carboxyl-modified silicone oil, a methacryl-modified silicone oil, a phenol-modified silicone oil, and an alkoxy-modified silicone oil. One of these may be used alone, or two or more thereof may be used in combination.

<Others>

The surface layer may be subjected to modification, introduction of functional groups and molecular chains, coating and surface treatment with a releasing agent or the like, within the range not impairing the effects of the present invention.

<Thickness of Surface Layer>

The surface layer has a thickness of, preferably 0.1 µm or more and 100 µm or less, more preferably 1 µm or more and 50 µm or less. The specific method for measuring the thickness of a surface layer is described later.

<Universal Hardness of Surface of Surface Layer>

The universal hardness of the surface of a surface layer is 1.0 N/mm$^2$ or more and 5.0 N/mm$^2$ or less. The universal hardness of the surface of a surface layer is preferably 1.5 N/mm$^2$ or more and 4.5 N/mm$^2$ or less, more preferably 2.0 N/mm$^2$ or more and 4.0 N/mm$^2$ or less.

In order to inhibit the deformation occurring at the outermost surface of the surface layer, the hardness of the outermost surface of the surface layer needs to be controlled. The universal hardness of the surface layer is controlled to be 1.0 N/mm$^2$ or more when an indenter is pressed into the surface layer to a depth of 1 µm, so that the occurrence of density irregularities of an image derived from the deformation of a charging member in contact with an electrophotographic photosensitive member in a resting state for a long period can be inhibited.

With a universal hardness of 5.0 N/mm$^2$ or less, the followability to the elastic deformation of the elastic layer is improved, so that the peeling off of the surface layer from the elastic layer can be effectively inhibited for a long term use.

The universal hardness is a physical property which can be obtained by pressing an intender into an object to be measured with a load, as (test load)/(surface area of indenter under test load) [N/mm$^2$]. The universal hardness of the surface of the surface layer of the present invention is a value measured by the method described later.

<Martens Hardness of Convex of Surface Layer Derived from Roughness-Providing Particle>

In the case of the surface of the member for electrophotography having the convex derived from a roughness-providing particle, the Martens hardness of the convex is preferably 7.0 N/mm$^2$ or less, particularly preferably 6.0 N/mm$^2$ or less, further preferably 4.0 N/mm$^2$ or less.

A contact portion of the member for electrophotography with the photosensitive member is a convex derived from the roughness-providing particle, in particular, when using the charging member and the photosensitive member with a difference of circumferential speed therebetween, the urethane resin on the convex derived from the roughness-providing particle tends to be scraped by the use. Scraped amount of urethane resin can be suppressed by reducing the hardness of the roughness-providing particle.

The lower limit of the Martens hardness of the convex is not particularly limited, and can be, for example, 0.1 N/mm$^2$ or more. The Martens hardness of the convex of the surface of a member for electrophotography derived from a roughness-providing particle is a value measured by the method described later.

The correlation between the hardness of a roughness-providing particle and the functionalities can be accurately estimated by measuring the Martens hardness when the load reaches 0.04 mN in pressing an indenter into the convex of the surface layer.

The Martens hardness of the convex fundamentally reflects the hardness of a roughness-providing particle. In order to control the Martens hardness of the convex in the numerical range, a roughness-providing particle having a Martens hardness in the range can be therefore selected as the roughness-providing particle. More specifically, a roughness-providing particle having a Martens hardness in the numerical range can be used, and can be appropriately selected from particles of resin such as an acrylic resin, a polycarbonate resin, a urethane resin, a fluorine resin and a silicone resin.

<Method for Producing Member for Electrophotography>

The method for producing the member for electrophotography of the present invention includes the steps of: forming an elastic layer including a quaternary ammonium salt and an epichlorohydrin rubber on a support; and forming a surface layer by applying a coating liquid including any one or both of the compounds having structures represented by the Formulae (6) and (7), any one or both of the compounds represented by the Formulae (8) and (9), and a compound represented by the Formula (10) on the surface of the elastic layer; the surface layer having a surface with a universal hardness of 1.0 N/mm$^2$ or more and 5.0 N/mm$^2$ or less. As described above, the coating liquid can include the reactive silicone oil, from the viewpoint of substantially inhibiting the occurrence of bleeding. The content of the reactive silicone oil in the coating liquid can be 0.001 parts by mass or more and 5 parts by mass or less. Examples of the coating method of the coating liquid include an application method such as electrostatic spraying, dipping and ring coating. The coating liquid applied to the surface of the elastic layer is dried to form a surface layer. The surface layer may be surface treated, so that the physical properties such as dynamic friction coefficient and surface free energy can be adjusted. Specific examples of the surface treatment method include irradiation of the surface layer with active energy rays. Examples of the active energy rays include ultraviolet rays, infrared rays and electron rays, and ultraviolet rays can be used.

<Image Forming Apparatus>

The image forming apparatus of the present invention includes an electrophotographic photosensitive member, a charging apparatus for charging the electrophotographic photosensitive member, a developing apparatus for developing an electrostatic latent image formed on the electrophotographic photosensitive member with a developer, and a transfer member for transferring the developer supported on the electrophotographic photosensitive member on a transfer medium. The charging apparatus includes the member for electrophotography of the present invention as charging member. The charging apparatus may include a voltage application unit for applying a voltage to the charging member. The charging apparatus comes in contact with the electrophotographic photosensitive member so as to charge the surface of the electrophotographic photosensitive member, and can collect the residual developer on the electrophotographic photosensitive member after transfer step of transferring the developer supported on the electrophotographic photosensitive member on a transfer medium. An example of the image forming apparatus of the present invention is illustrated in FIG. 1.

The image forming apparatus illustrated in FIG. 1 includes an electrophotographic photosensitive member 5 rotating in clockwise direction of FIG. 1, a charging member 6 as the member for electrophotography of the present invention, a transfer member 10, a cleaner vessel 11, a cleaning blade 12, a fixing device 13, a pickup roller 14, and the like. The electrophotographic photosensitive member 5 is charged with a charging member 6 to which a voltage is applied by a voltage application device not illustrated in drawing. The electrophotographic photosensitive member 5 is irradiated with laser beams from a laser generation unit 16 for exposure, so that an electrostatic latent image corresponding to an objective image is formed on the charged surface of the electrophotographic photosensitive member 5. The electrostatic latent image on the electrophotographic photosensitive member 5 is developed with toner as developer in a developing apparatus 9 through a toner bearing member 7 and a toner supply member 8 so as to make a toner image. The toner image is transferred on a transfer medium 15 by a transfer member 10, to which a voltage with a reversed polarity to that of toner is applied, in contact with the electrophotographic photosensitive member 5 through the transfer medium 15 such as paper to be transferred to. The transfer medium 15 with a toner image placed thereon is carried to the fixing device 13, so that the toner image is fixed on the transfer medium 15. A part of the toner, which remains on the electrophotographic photosensitive member 5, is scraped off by the cleaning blade 12 so as to be accommodated in the cleaner vessel 11.

The charging apparatus of the present invention can be a contact charging apparatus having the electrophotographic photosensitive member 5 and the charging member 6 in contact with each other to form a contact part, which charges the surface of the electrophotographic photosensitive member 5 at a predetermined polarity and potential with application of a predetermined charging bias to the charging member. The contact charging using the apparatus can achieve stable and uniform charging and reduce the generation of ozone. In order to maintain the uniform contact with the electrophotographic photosensitive member 5 for uniform charging, a charging member 6 which rotates in the opposite direction as that of the electrophotographic photosensitive member 5 can be used. That is, in the case that the electrophotographic photosensitive member 5 is rotated in the clockwise direction, the charging member is preferably rotated in the counterclockwise direction.

The charging member 6 can move at a different speed from that of the electrophotographic photosensitive member 5, from the viewpoint of achieving more effects of the present invention.

In an aspect of the present invention, a member for electrophotography capable of forming a high quality electrophotographic image for a long period can be provided. In another aspect of the present invention, an image forming apparatus capable of stably forming a high quality image for a long period can be provided.

EXAMPLES

The present invention is described in more detail below with reference to Examples, but the present invention is not limited thereto. In the specification, "parts" means "parts by mass".

Example 1

1. Preparation of Unvulcanized Rubber Composition

The materials each described in Table 1 were mixed with a pressure kneader, so that an A-kneaded rubber composition was obtained.

An unvulcanized rubber composition was prepared by mixing 183.0 parts by mass of the obtained A-kneaded rubber composition and the materials each described in Table 2 with an open roll.

TABLE 1

| Material | Parts by mass |
|---|---|
| Epichlorohydrin-ethylene oxide-allyl glycidyl ether ternary copolymer (GECO) (trade name: EPICHLOMER CG-102, manufactured by Osaka Soda Co., Ltd. (formally Daiso Co., Ltd.)) | 100.0 |
| Zinc oxide (second-class zinc oxide, manufactured by Seido Chemical Industry Co., Ltd.) | 5.0 |
| Calcium carbonate (trade name: SILVER W, manufactured by Shiraishi Calcium Kaisha, Ltd.) | 60.0 |
| Carbon black (trade name: THERMAX FLOFORM N990, manufactured by Cancarb Limited) | 5.0 |
| Stearic acid | 1.0 |
| Aliphatic polyester plasticizer (trade name: POLYCIZER P202, manufactured by DIC Corporation (formally Dainippon Ink and Chemicals, Inc.)) | 10.0 |
| Ionic conductive material: quaternary ammonium perchlorate (trade name: ADEKACIZER LV70, manufactured by Adeka Corporation) | 2.0 |

TABLE 2

| Material | Parts by mass |
|---|---|
| Sulfur (trade name: SULFAX PMC, manufactured by Tsurumi Chemical Co., Ltd.) | 0.8 |
| Dibenzothiazolyl disulfide (trade name: NOCCELER DM, manufactured by Ouchi Shinko Chemical Industrial Co., Ltd.) | 1.0 |
| Tetramethylthiuram monosulfide (trade name: NOCCELER TS, manufactured by Ouchi Shinko Chemical Industrial Co., Ltd.) | 0.5 |

2. Preparation of Elastic Member

A round bar of free-cutting steel having a surface electroless nickel plated with a full length of 252 mm and an outer diameter of 6 mm was prepared as support. Subsequently, an adhesive was applied to the whole circumference of the support, in a 230 mm range except for 11 mm at both ends, respectively. An electro-conductive hot melt type adhesive was used as the adhesive. A roll coater was used for application of the adhesive.

Subsequently, a cross head extruder having a discharging mechanism of an unvulcanized rubber roller and a supply mechanism of the support were prepared. A dice having an inner diameter of 12.5 mm was fixed to the cross head. The extruder and the cross head were controlled at 80° C., and the transport velocity of the support was controlled at 60 mm/sec. Under the conditions, the unvulcanized rubber composition was supplied from the extruder, and the support was covered with the unvulcanized rubber composition in the cross head so as to obtain an unvulcanized rubber roller. Subsequently, the unvulcanized rubber roller was fed in a hot air vulcanizing furnace at 170° C., and heated for 60 minutes so as to obtain an unpolished elastic component. Subsequently, the ends of the elastic layer were removed by cutting. Lastly, the surface of the elastic layer was polished with a grinding wheel. An elastic member having a diameter at the central part of 8.5 mm was thereby obtained. The elastic member has a crown quantity (difference in the outer diameter between a central part and a position 90 mm away from the central part) was 110 μm.

3. Preparation of Coating Liquid No. 1

<Preparation of Isocyanate Group Terminal Prepolymer B-1>

In a reaction vessel under nitrogen atmosphere, 100 parts by mass of polybutadiene polyol (trade name: G2000, manufactured by Nippon Soda Co., Ltd.) was gradually dropped in 27 parts by mass of polymeric MDI (trade name: MILLIONATE MR200, manufactured by Tosoh Corporation (formerly Nippon Polyurethane Industry Co., Ltd.)), with the temperature in the reaction vessel being kept at 65° C. After completion of the dropping, the reaction was performed at 65° C. for 2 hours. The obtained reaction mixture was cooled to room temperature, and an isocyanate group terminal prepolymer B-1 with an isocyanate group content of 4.3 mass % was obtained.

A mixture liquid 1 was obtained by adding 55.2 parts by mass of the isocyanate group terminal prepolymer B-1, 44.5 parts by mass of hydrogenated polyisoprene polyol (trade name: EPOL, manufactured by Idemitsu Kosan Co., Ltd.), and 20.0 parts by mass of carbon black (trade name: FW-18, manufactured by Evonik Degussa Co., Ltd.), and then the solid content was adjusted, to 27 mass % with butyl acetate.

In a glass bottle with an internal capacity of 450 mL, 270 parts by mass of the mixture liquid No. 1 and 200 parts by mass of glass beads having an average particle diameter of 0.8 mm were placed so as to be dispersed with a medium-stirring type dispersion apparatus (trade name: Paint Shaker, manufactured by TOYO Seiki Seisaku-Sho Ltd.) for 12 hours. Subsequently the glass beads were removed, so that a coating liquid No. 1 for forming a surface layer was obtained.

4. Preparation of Member for Electrophotography

The elastic member was dipped in the coating liquid No. 1 one time, and air-dried at 23° C. for 30 minutes. Subsequently, the elastic member was dried in a hot air circulating dryer preset at 80° C. for 1 hour, and further dried in a hot air circulating dryer preset at 160° C. for 1 hour, so that a member for electrophotography having a surface layer on the outer circumferential surface of the elastic member was manufactured. The immersing time in dipping was 9 seconds. The pulling speed in dipping was preset to have an initial speed of 20 mm/sec and a final speed of 2 mm/sec, with the speed being changed linearly with the time between from 20 mm/sec to 2 mm/sec.

5. Evaluation

Subsequently, the member for electrophotography obtained was evaluated as follows.

<Evaluation 5-1. Thickness of Surface Layer>

The cross sections at total 9 spots of the surface layer in a 3×3 array in the axial direction and in the circumferential direction were observed with an optical microscope or an electron microscope so as to measure each of the thickness of the spots. The average of the measurement was employed as the thickness. The results are described in Table 6.

<Evaluation 5-2. Universal Hardness of Surface of Surface Layer>

The universal hardness at a position at a depth of 1 μm from the surface of the surface layer was measured with a universal hardness tester.

An ultra-micro hardness tester (trade name: FISCHER-SCOPE HM-2000, manufactured by Helmut Fischer) was used for the measurement. Specific measurement conditions are as follows:

Measurement indenter: Vickers indenter, interfacial angle 136°, Young's modulus of 1140, Poisson's ratio of 0.07;
Indenter material: diamond;
Measurement environment: temperature: 23° C., relative humidity: 50%;
Maximum test load: 1.0 mN;
Load condition: The applied load was increased in proportion with time, at a rate reaching the maximum test load in 30 seconds.

In the present evaluation, using the load F at the time when the indenter is pressed into a depth of 1 μm from the surface of the surface layer and the contact area A between the indenter and the surface layer at the time, the universal hardness is calculated based on the following Calculation Formula (1).

$$\text{Universal hardness }(N/mm^2) = F/A \qquad \text{Calculation Formula (1)}$$

<Evaluation 5-3. Martens Hardness of Convex Derived from Roughness-Providing Particle of Surface Layer>

The Martens hardness of the convex derived from a roughness-providing particle of the surface of a surface layer was measured with a universal hardness tester. More specifically, an ultra-micro hardness tester (trade name: PICO-DENTOR HM-500, manufactured by Helmut Fischer) was used.

The measurement conditions are as follows:

Measurement indenter: Vickers indenter, interfacial angle 136°, Young's modulus of 1140, Poisson's ratio of 0.07;
Indenter material: diamond
Measurement environment: temperature: 23° C., relative humidity: 50%;
Loading speed and unloading speed: 1 mN/50 seconds.

In the present evaluation, the tip of the indenter is contacted with the convex derived from a roughness-providing particle on the surface of a member for electrophotography, and the load is applied at the rate described in the conditions. At the time when the load reaches 0.04 mN, the push-in depth h is then obtained. The Martens hardness is calculated based on the following Calculation Formula (2).

$$\text{Martens hardness HM }(N/mm^2) = F(N)/\text{surface area of indenter under test load }(mm^2) = F/(26.43 \times h^2) \qquad \text{Calculation Formula (2)}$$

h: push-in depth of indenter

<Evaluation 5-4. Evaluation on Contamination of Electrophotographic Photosensitive Member (Initial Stage)>

A laser beam printer (trade name: HP LASER JET P1505 PRINTER, manufactured by Hewlett Packard Company) was prepared as electrophotographic apparatus. The laser beam printer can discharge A4-size sheets of paper in the longitudinal direction. The laser beam printer has a printing speed of 23 sheets/min, and an image resolution of 600 dpi. The member for electrophotography obtained was incorporated as charging member in a process cartridge (trade name: "HP 36A (CB436A)", manufactured by Hewlett Packard Company). The process cartridge was installed on the laser beam printer, and left standing under an environment at a temperature of 50° C. and a relative humidity of 95% for 40 days. An accelerated test for evaluating the contamination properties of an electrophotographic photosensitive member was thus performed.

Figure 3:
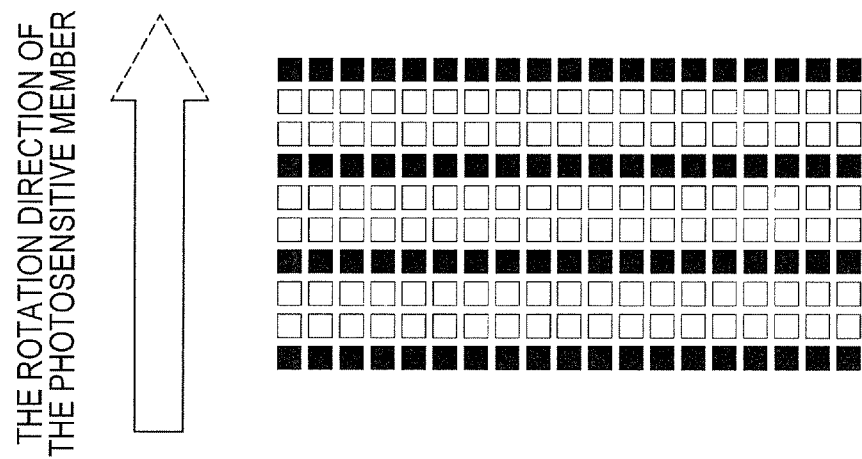
FIG. 3 is an explanatory view of a halftone image.

Subsequently, a half tone image, in which lines having a width of 1 dot are drawn in a direction perpendicular to the rotation direction of the photosensitive member at 2 dots interval as shown in FIG. 3, was outputted under a normal temperature and a normal humidity environment, so that the halftone image obtained was observed with naked eye. Further, the surface of the electrophotographic photosensitive member just after forming the halftone image, was observed with an optical microscope (trade name: Digital Microscope VHX-5000; manufactured by KEYENCE CORPORATION), and confirmed whether a contamination substance migrating from a charging member, was adhered or not. The results are described in Table 6.

A: No contamination substance migrating from a charging member to an electrophotographic photosensitive member was confirmed, and a high quality image was obtained.

B: A small amount of contamination substances migrating from a charging member to an electrophotographic photosensitive member was confirmed, but a high quality image was obtained.

C: Contamination substances migrating from a charging member to an electrophotographic photosensitive member was confirmed. The contamination substances remained on the surface of the electrophotographic photosensitive member, so that the charging properties, development properties, and transfer properties of the region changed. White hazy images are generated periodically with the circumferential length of the charging member and the electrophotographic photosensitive member, which caused no practical problem.

D: Contamination substances migrating from a charging member to an electrophotographic photosensitive member was confirmed. A large amount of contamination substances remained on the surface of the charging member and the electrophotographic photosensitive member, so that the charging properties, development properties, and transfer properties of the region notably changed. Many white hazy images were generated periodically with the circumferential length of the charging member and the electrophotographic photosensitive member.

<Evaluation 5-5. Evaluation on Contamination of Electrophotographic Photosensitive Member (After Endurance)>

A gear was installed on the member for electrophotography such that the member for electrophotography rotates at a circumferential speed with a difference of 10% in the forward direction relative to the rotation of the electrophotographic photosensitive member. The member for electrophotography was incorporated as charging member in a process cartridge (trade name: "HP 36A (CB436A)", manufactured by Hewlett Packard Company). Using a laser beam printer (trade name: "HP LASERJET P1505 PRINTER", manufactured by Hewlett Packard Company), 1,000 sheets of solid white image were outputted under a low temperature and low humidity environment (temperature: 15° C., relative humidity: 10%). The member for electrophotography was removed from the process cartridge and the thickness of the surface layer of the member for electrophotography was measured in accordance with the Evaluation 5-1. The scraped thickness of the surface layer was obtained by subtracting the thickness of the surface layer after endurance from the thickness of the surface layer in the initial stage. The results are described in Table 6.

The member for electrophotography was again incorporated as charging member in a process cartridge (trade name: "HP 36A (CB436A)", manufactured by Hewlett Packard Company) and left standing under a severe environment at a temperature of 50° C. and a relative humidity of 95% for 40 days. An accelerated test for evaluating the contamination properties of an electrophotographic photosensitive member was thus performed. The process cartridge left standing in the severe environment for 40 days was then installed on a laser beam printer (trade name: HP LASERJET P1505 PRINTER, manufactured by Hewlett Packard Company). Subsequently, a half tone image, in which lines having a width of 1 dot are drawn in a direction perpendicular to the rotation direction of the photosensitive member at 2 dots interval as shown in FIG. 3, was outputted under a normal temperature and a normal humidity environment, so that the image obtained was evaluated on the following criteria. The results are described in Table 6.

A: No contamination substance migrating from a charging member to an electrophotographic photosensitive member was confirmed, and a high quality image was obtained.

B: A small amount of contamination substances migrating from a charging member to an electrophotographic photosensitive member was confirmed, but a high quality image was obtained.

C: Contamination substances migrating from a charging member to an electrophotographic photosensitive member was confirmed. The contamination substances remained on the surface of the electrophotographic photosensitive member, so that the charging properties, development properties, and transfer properties of the region changed. White hazy images are generated periodically with the circumferential length of the charging member and the electrophotographic photosensitive member, which caused no practical problem.

D: Contamination substances migrating from a charging member to an electrophotographic photosensitive member was confirmed. A large amount of contamination substances remained on the surface of the charging member and the electrophotographic photosensitive member, so that the charging properties, development properties, and transfer properties of the region notably changed. Many white hazy images were generated periodically with the circumferential length of the charging member and the electrophotographic photosensitive member.

<Evaluation 5-6> Measurement of Average Particle Diameter of Roughness-Providing Particle in Surface Layer (Examples 7 to 9 only)

The average particle size of the roughness-providing particle in the surface layer was measured by using an FIB-SEM. Specifically, FIB-SEM (trade name: dual beam SEM Helios600, manufactured by FEI Company.) was used. The concrete measuring method is shown below.

A blade of cutter was contacted against the member for electrophotography (roller shape), and a section was cut out so that a length in an x-axis direction (a longitude direction of the roller) and a y-axis direction (a tangential direction of a circular section in a cross section of the roller perpendicular to the x-axis) were 5 mm respectively. The cut out section was observed from a z-direction (a diametrical direction in a cross section of the roller perpendicular to the x-axis) through the use of the FIB-SEM apparatus under the conditions that acceleration voltage is 10 kV and magnification is 1,000 times. Then, a total of 100 pieces of cross-sectional images from the surface to a depth of 20 μm at 200 nm intervals in the z-direction was taken with an ion beam current of 20 nA using gallium ion beam. With respect to each of roughness-providing particles observed in a cross-sectional image, the maximum diameter of the particle was defined as a diameter of the particle, and the average value of diameters of 20 particles was defined as the average particle diameter.

Examples 2 to 9, and 11 to 13

Preparation of Isocyanate Group Terminal Prepolymer B-2

An isocyanate group terminal prepolymer B-2 having an isocyanate group content of 4.3 mol % was prepared in the same way as in the case of the isocyanate group terminal prepolymer B-1, except that polybutadiene polyol (trade name: G2000, manufactured by Nippon Soda Co., Ltd.) for use in preparing the isocyanate group terminal prepolymer B-1 was replaced with hydrogenated polybutadiene polyol (trade name: GI2000, manufactured by Nippon Soda Co., Ltd.).

<Preparation of Coating Liquid Nos. 2 to 12>

Coating liquids Nos. 2 to 12 were prepared in the same way as in the case of the coating liquid No. 1, except that the composition was changed to those described in Table 3-1 and Table 3-2. The specific material names of the polyol (A) as hydroxyl group terminal prepolymer, the roughness-providing particle (C), and the silicone additive (D) in Table 3-1 and Table 3-2 are described in Table 4.

<Making of Member for Electrophotography>

The members for electrophotography in Examples 2 to 9, and 11 to 13 were manufactured in the same way as in the case of the member for electrophotography in Example 1, except that the coating liquid No. for use in forming the surface layer and the thickness of the surface layer were changed to those described in Table 6-1 and Table 6-2. The members for electrophotography in Examples 2 to 9, and 11 to 13 were subjected to Evaluation 5-1 to Evaluation 5-5. The members for electrophotography in Examples 7 to 9 were subjected to Evaluation 5-6. The evaluation results are described in Table 7-1 and Table 7-2.

TABLE 3-1

|  | Coating liquid No. | | | | | |
| --- | --- | --- | --- | --- | --- | --- |
|  | 1 | 2 | 3 | 4 | 5 | 6 |
| Polyol (A) | A-1 | A-1 | A-1 | A-1 | A-1 | A-1 |
| Isocyanate (B) | B-1 | B-1 | B-1 | B-1 | B-1 | B-1 |
| Amount of A/B added (parts by mass) | 45/55 | 45/55 | 45/55 | 45/55 | 45/55 | 45/55 |
| Roughness-providing particle (C) | — | — | — | — | C-1 | C-1 |
| Amount of (C) added (parts by mass) | — | — | — | — | 30 | 30 |
| Silicone additive (D) | — | D-1 | D-1 | D-2 | — | D-1 |
| Amount of (D) added (parts by mass) | — | 0.1 | 0.5 | 0.1 | — | 0.5 |

TABLE 3-2

|  | Coating liquid No. | | | | | |
| --- | --- | --- | --- | --- | --- | --- |
|  | 7 | 8 | 9 | 10 | 11 | 12 |
| Polyol (A) | A-1 | A-1 | A-2 | A-2 | A-3 | A-4 |
| Isocyanate (B) | B-1 | B-2 | B-2 | B-2 | B-3 | B-4 |
| Amount of A/B added (parts by mass) | 45/55 | 41/59 | 47/53 | 46/54 | 46/54 | 41/59 |
| Roughness-providing particle (C) | C-2 | — | — | — | — | — |
| Amount of (C) added (parts by mass) | 30 | — | — | — | — | — |
| Silicone additive (D) | — | — | — | — | — | — |
| Amount of (D) added (parts by mass) | — | — | — | — | — | — |

TABLE 4

| | Compound name |
| --- | --- |
| A-1 | Hydrogenated polyisoprene polyol (trade name: EPOL, manufactured by Idemitsu Kosan Co., Ltd.) |
| A-2 | Polyisoprene polyol (trade name: Poly ip, manufactured by Idemitsu Kosan Co., Ltd.) |
| A-3 | Polybutadiene polyol (trade name: G1000, manufactured by Nippon Soda Co., Ltd.) |
| A-4 | Polyether polyol (trade name: EXCENOL3020, manufactured by Asahi Glass Co., Ltd.) |
| B-1 | Polybutadiene polyol/polymeric MDI (trade name: G2000, manufactured by Nippon Soda/trade name: MILLIONATE MR200, manufactured by Tosoh Corporation) |
| B-2 | Hydrogenated polybutadiene polyol/polymeric MDI (trade name: GI2000, manufactured by Nippon Soda/trade name: MILLIONATE MR200, manufactured by Tosoh Corporation) |
| B-3 | Hydrogenated polybutadiene polyol/polymeric MDI (trade name: GI1000, manufactured by Nippon Soda/trade name: MILLIONATE MR200, manufactured by Tosoh Corporation) |
| B-4 | Polypropylene glycol polyol/polymeric MDI (trade name: EXCENOL 1030, manufactured by Asahi Glass Corporation/trade name: MILLIONATE MR200, manufactured by Tosoh Corporation) |
| C-1 | DAIMICBEAZ UCN-5070D (trade name, average particle diameter: 7.0 μm, manufactured by Dainichiseika Color and Chemicals Mfg. Co., Ltd) |
| C-2 | TECHPOLYMER MBX-8 (trade name, average particle diameter: 8.0 μm, manufactured by Sekisui Plastics Co., Ltd.) |

TABLE 4-continued

| | Compound name |
| --- | --- |
| D-1 | Modified dimethyl silicone oil (trade name: SH-28PA, manufactured by Dow Corning Toray Co., Ltd.) |
| D-2 | Silicone modified acrylic resin (trade name: SQ-100, manufactured by Tokushiki Co., Ltd.) |

Example 10

Preparation of Unvulcanized Rubber Composition

The unvulcanized rubber composition in Example 10 was prepared in the same way as in the case of the unvulcanized rubber composition in Example 1, except that the ionic conductive material "ADEKACIZER LV70" (hereinafter abbreviated as "LV70") in the unvulcanized rubber composition in Example 1 was replaced with cetyltrimethylammonium chloride manufactured by Tokyo Chemical Industry Co., Ltd., (hereinafter abbreviated as "CTAC").

<Making of Elastic Member>

An elastic member was made in the same way as in Example 1, except that the unvulcanized rubber composition described above was used.

<Making of Member for Electrophotography>

A member for electrophotography in Example 10 was made in the same way as in Example 1, except that the elastic member described above was used. The member for electrophotography thus obtained was subjected to Evaluations 5-1 to 5-5. The evaluation results are described in Table 7-2.

Example 14

Preparation of Unvulcanized Rubber Composition

The unvulcanized rubber composition in Example 14 was prepared in the same way as in the case of the unvulcanized rubber composition in Example 1, except that the epichlorohydrin-ethylene oxide-allyl glycidyl ether ternary copolymer (trade name: EPICHLOMER CG-102, manufactured by Osaka Soda Co., Ltd.), (hereinafter abbreviated as "CG102") in the unvulcanized rubber composition in Example 1 was replaced with the material described in Table 5.

TABLE 5

| Material | Parts by mass |
| --- | --- |
| Epichlorohydrin-ethylene oxide-allyl glycidyl ether ternary copolymer (GECO) (trade name: EPION 301, manufactured by Osaka Soda Co., Ltd.) | 100.0 |

<Making of Elastic Member>

An elastic member was made in the same way as in Example 1, except that the unvulcanized rubber composition described above was used.

<Making of Member for Electrophotography>

A member for electrophotography in Example 14 was made in the same way as in Example 1, except that the elastic member described above was used. The member for electrophotography thus obtained was subjected to Evaluations 5-1 to 5-5. The evaluation results are described in Table 7-2.

Example 15

Preparation of Unvulcanized Rubber Composition

The unvulcanized rubber composition in Example 15 was prepared in the same way as in the case of the unvulcanized rubber composition in Example 14, except that the ionic conductive material "ADEKACIZER LV70" (hereinafter abbreviated as "LV70") in the unvulcanized rubber composition in Example 14 was replaced with "CTAC".

<Making of Elastic Member>

An elastic member was made in the same way as in Example 14, except that the unvulcanized rubber composition described above was used.

<Making of Member for Electrophotography>

A member for electrophotography in Example 15 was made in the same way as in Example 14, except that the elastic member described above was used. The member for electrophotography thus obtained was subjected to Evaluations 5-1 to 5-5. The evaluation results are described in Table 7-2.

TABLE 6-1

| | Examples | | | | | | | |
|---|---|---|---|---|---|---|---|---|
| | 1 | 2 | 3 | 4 | 5 | 6 | 7 | 8 |
| Type of rubber material for use in forming elastic layer | CG102 | CG102 | CG102 | CG102 | CG102 | CG102 | CG102 | CG102 |
| Type of ionic conductive material | LV70 | LV70 | LV70 | LV70 | LV70 | LV70 | LV70 | LV70 |
| Coating liquid No. for use in forming surface layer | 1 | 1 | 1 | 2 | 3 | 4 | 5 | 6 |
| Thickness of surface layer (μm) | 15 | 5 | 10 | 15 | 15 | 15 | 10 | 10 |

TABLE 6-2

| | Examples | | | | | | |
|---|---|---|---|---|---|---|---|
| | 9 | 10 | 11 | 12 | 13 | 14 | 15 |
| Type of rubber material for use in forming elastic layer | CG102 | CG102 | CG102 | CG102 | CG102 | EPION301 | EPION301 |
| Type of ionic conductive material | LV70 | CTAC | LV70 | LV70 | LV70 | LV70 | CTAC |
| Coating liquid No. for use in forming surface layer | 7 | 1 | 8 | 9 | 10 | 1 | 1 |
| Thickness of surface layer (μm) | 15 | 15 | 15 | 15 | 15 | 15 | 15 |

TABLE 7-1

| Evaluation | Examples | | | | | | | |
|---|---|---|---|---|---|---|---|---|
| | 1 | 2 | 3 | 4 | 5 | 6 | 7 | 8 |
| Universal hardness (N/mm$^2$) of surface layer surface | 3.1 | 2.5 | 2.7 | 3.0 | 2.9 | 3.3 | 3.2 | 3.1 |
| Martens hardness (N/mm$^2$) at convex derived from roughness-providing particle of surface layer | — | — | — | — | — | — | 3.5 | 3.5 |
| Average particle diameter (μm) of roughness-providing particle of surface layer | — | — | — | — | — | — | 7.2 | 7.1 |
| Contamination of electrophotographic photosensitive member (initial stage) | A | C | B | A | A | A | A | A |
| Contamination of electrophotographic photosensitive member (after endurance) | B | C | B | A | A | A | B | A |
| Scraped thickness (μm) of surface layer | 3 | 2 | 2 | 1 | 0 | 2 | 3 | 0 |

TABLE 7-2

| Evaluation | Examples | | | | | | |
|---|---|---|---|---|---|---|---|
| | 9 | 10 | 11 | 12 | 13 | 14 | 15 |
| Universal hardness (N/mm$^2$) of surface layer surface | 3.5 | 3.1 | 4.8 | 4.1 | 3.5 | 3.0 | 3.1 |
| Martens hardness (N/mm$^2$) at convex derived from roughness-providing particle of surface layer | 12.2 | — | — | — | — | — | — |
| Average particle diameter (μm) of roughness-providing particle of surface layer | 7.8 | — | — | — | — | — | — |

TABLE 7-2-continued

|  | Examples | | | | | | |
|---|---|---|---|---|---|---|---|
| Evaluation | 9 | 10 | 11 | 12 | 13 | 14 | 15 |
| Contamination of electrophotographic photosensitive member (initial stage) | A | B | B | B | B | B | B |
| Contamination of electrophotographic photosensitive member (after endurance) | C | B | B | B | B | B | C |
| Scraped thickness (μm) of surface layer | 5 | 3 | 4 | 3 | 2 | 3 | 3 |

Comparative Examples 1 and 2

Preparation of Isocyanate Group Terminal Prepolymer B-3

An isocyanate group terminal prepolymer B-3 having an isocyanate group content of 4.3 mol % was prepared in the same way as in the case of the isocyanate group terminal prepolymer B-1, except that polybutadiene polyol (trade name: G2000, manufactured by Nippon Soda Co., Ltd.) for use in preparing the isocyanate group terminal prepolymer B-1 was replaced with hydrogenated polybutadiene polyol (trade name: GI1000, manufactured by Nippon Soda Co., Ltd.).

<Preparation of Isocyanate Group Terminal Prepolymer B-4>

An isocyanate group terminal prepolymer B-4 having an isocyanate group content of 4.3 mol % was prepared in the same way as in the case of the isocyanate group terminal prepolymer B-1, except that polybutadiene polyol (trade name: G2000, manufactured by Nippon Soda Co., Ltd.) for use in preparing the isocyanate group terminal prepolymer B-1 was replaced with polypropylene glycol polyol (trade name EXCENOL 1030, manufactured by Asahi Glass Corporation).

<Preparation of Coating Liquid Nos. 11 and 12>

Coating liquid Nos. 11 and 12 were prepared in the same way as in the case of the coating liquid No. 1, except that the composition was changed to those described in Table 3-2.

<Making of Member for Electrophotography>

The members for electrophotography in Comparative Example 1 and Comparative Example 2 were made in the same way as in the case of the member for electrophotography in Example 1, except that the coating liquid No. for forming a surface layer and the thickness of the surface layer were changed to those described in Table 8-1. The members for electrophotography in Comparative Example 1 and Comparative Example 2 were subjected to Evaluation 5-1 to Evaluation 5-5. The evaluation results are described in Table 8-2.

TABLE 8-1

|  | Comparative Examples | |
|---|---|---|
|  | 1 | 2 |
| Type of rubber material for use in forming elastic layer | CG102 | CG102 |
| Type of ionic conductive material | LV70 | LV70 |

TABLE 8-1-continued

|  | Comparative Examples | |
|---|---|---|
|  | 1 | 2 |
| Coating liquid No. for use in forming surface layer | 11 | 12 |
| Thickness (μm) of surface layer | 10 | 20 |

TABLE 8-2

|  | Comparative Examples | |
|---|---|---|
| Evaluation | 1 | 2 |
| Universal hardness (N/mm$^2$) of surface layer surface | 6.7 | 2.5 |
| Martens hardness (N/mm$^2$) at convex derived from roughness-providing particle of surface layer | — | — |
| Contamination of electrophotographic photosensitive member (initial stage) | B | D |
| Contamination of electrophotographic photosensitive member (after endurance) | D | D |
| Scraped thickness (μm) of surface layer | 8 | 2 |

The member for electrophotography in Comparative Example 1 had a high universal hardness at the surface of the surface layer. After endurance testing, the shaving of the surface layer and peeling off from the elastic layer were observed. As a result, adhesion of the components derived from the elastic layer to the surface of the electrophotographic photosensitive member was confirmed.

After endurance testing of the member for electrophotography in Comparative Example 2, adhesion of the components derived from the elastic layer to the surface of the electrophotographic photosensitive member was also confirmed. The reason is presumed that the urethane resin as a binder resin contained in the surface layer of the member for electrophotography in Comparative Example 2 has an alkylene oxide structure in the soft segment. Such a soft segment includes a hydrophilic compound derived from the elastic layer. It is conceivable that the components derived from the elastic layer therefore easily invade the surface layer, and the surface layer cannot sufficiently prevent the components derived from the elastic layer from passing through.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-241941, filed Nov. 28, 2014, which is hereby incorporated by reference herein in its entirety.

What is claimed is:

1. A member for electrophotography comprising:

a support, an elastic layer on the support, and a surface layer on the elastic layer;

wherein,
the elastic layer comprises a quaternary ammonium salt and an epichlorohydrin rubber;
the surface layer comprises a polymer having:
any one or both of the structures represented by the following Formulae (1) and (2),
any one or both of the structures represented by the following Formulae (3) and (4), and
a structure represented by the following Formula (5); and,
a universal hardness of a surface of the surface layer is 1.0 N/mm² or more and 5.0 N/mm² or less:

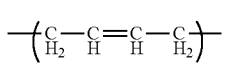
Formula (1)

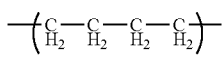
Formula (2)

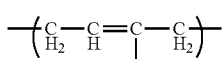
Formula (3)

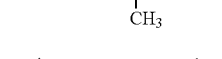
Formula (4)

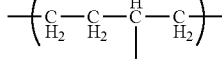
Formula (5)

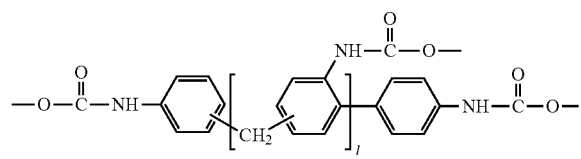

wherein l represents an integer of 1 or more.

2. The member for electrophotography according to claim 1, wherein the quaternary ammonium salt comprises a perchlorate ion and a quaternary ammonium ion.

3. The member for electrophotography according to claim 1, wherein the surface layer comprises a roughness-providing particle having an average particle diameter of 3 μm or more and 30 μm or less, and
the surface of the surface layer has a convex derived from the roughness-providing particle.

4. The member for electrophotography according to claim 3, wherein the convex of the surface layer has a Martens hardness of 7.0 N/mm² or less.

5. A method for producing a member for electrophotography comprising a support, an elastic layer on the support, and a surface layer on the elastic layer, a surface of the surface layer having a universal hardness of 1.0 N/mm² or more and 5.0 N/mm² or less, the method comprising the steps of:
forming the elastic layer comprising a quaternary ammonium salt and an epichlorohydrin rubber on a support;
forming a coat of a coating liquid on the elastic layer, the coating liquid comprising a polyol and an polyisocyanate; and
reacting the polyol and the polyisocyanate in the coat to form the surface layer, wherein
the polyol contains:
any one or both of the following a) and b);
any one or both of the following c) and d); and
the polyisocyanate contains a following e):

a): any one or both of a compound having a structure represented by Formula (6) and a prepolymer derived from the compound having a structure represented by Formula (6);
b): any one or both of a compound having a structure represented by Formula (7) and a prepolymer derived from the compound having a structure represented by Formula (7);
c): any one or both of a compound represented by Formula (8) and a prepolymer derived from the compound represented by Formula (8);
d): any one or both of a compound represented by Formula (9) and a prepolymer derived from the compound represented by Formula (9); and
e): any one or both of a compound represented by Formula (10) and a prepolymer derived from the compound represented by Formula (10):

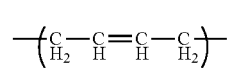
Formula (6)

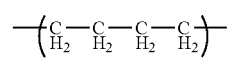
Formula (7)

Formula (8)
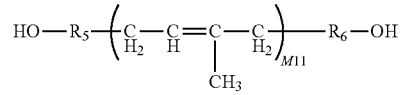

Formula (9)
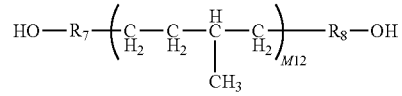

Formula (10)
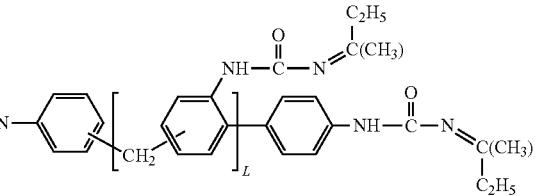

in the Formulae (8) to (9), $R_5$ to $R_8$ each independently represent a divalent organic group; and M11 and M12 each independently represent an integer of 1 or more; and in the Formulae (10), L represents an integer of 1 or more.

6. The method for producing a member for electrophotography according to claim 5, wherein the coating liquid comprises a reactive silicone oil.

7. An image forming apparatus comprising:
an electrophotographic photosensitive member;
a charging apparatus for charging the electrophotographic photosensitive member;
a developing apparatus for developing an electrostatic latent image formed on the electrophotographic photosensitive member with a developer; and
a transfer member for transferring the developer supported on the electrophotographic photosensitive member to a transfer medium; wherein,
the charging apparatus comprises a charging member having a support, an elastic layer on the support, and a surface layer on the elastic layer;
the elastic layer comprises a quaternary ammonium salt and an epichlorohydrin rubber;

the surface layer comprises a polymer having:
  any one or both of the structures represented by the following Formulae (1) and (2),
  any one or both of the structures represented by the following Formulae (3) and (4), and
  a structure represented by the following Formula (5); and,
a universal hardness of a surface of the surface layer is 1.0 N/mm² or more and 5.0 N/mm² or less:

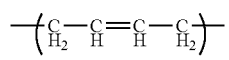

Formula (1)

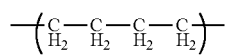

Formula (2)

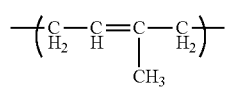

Formula (3)

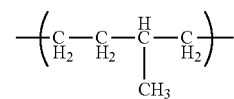

Formula (4)

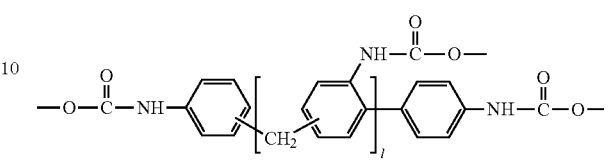

Formula (5)

wherein l represents an integer of 1 or more.

8. The image forming apparatus according to claim 7, wherein the charging member moves at a different speed from that of the electrophotographic photosensitive member.

* * * * *